United States Patent
Vatter

(10) Patent No.: US 6,761,512 B2
(45) Date of Patent: Jul. 13, 2004

(54) TOOL FOR REMOVING CUT-OFF PLASTIC PIPE IN A PIPE SOCKET AND METHOD OF USE

(76) Inventor: Hans C. Vatter, 70563 Norwalk Rd., Kimbolton, OH (US) 43749

( * ) Notice: Subject to any disclaimer, the term of this patent is extended or adjusted under 35 U.S.C. 154(b) by 111 days.

(21) Appl. No.: 10/038,562

(22) Filed: Jan. 3, 2002

(65) Prior Publication Data

US 2003/0121157 A1 Jul. 3, 2003

(51) Int. Cl.[7] .............................................. B23B 51/02
(52) U.S. Cl. ........................... 408/97; 408/84; 408/1 R; 408/224
(58) Field of Search .............................. 30/103; 7/157; 82/113; 408/1 R, 84, 83.5, 97, 110, 112, 113, 114, 224, 225

(56) References Cited

U.S. PATENT DOCUMENTS

| | | | | |
|---|---|---|---|---|
| 924,378 A | * | 6/1909 | Porter | 408/84 |
| 1,041,479 A | * | 10/1912 | Kaiser | 408/84 |
| 2,573,790 A | * | 11/1951 | Herzog | 408/83.5 |
| 2,830,500 A | * | 4/1958 | Schultis | 408/137 |
| 3,752,593 A | | 8/1973 | Fitzgerald et al. | |
| 3,872,748 A | | 3/1975 | Bjalme et al. | |
| 4,483,222 A | | 11/1984 | Davis | |
| 4,693,643 A | | 9/1987 | Heyworth | |
| 4,720,219 A | * | 1/1988 | Masonek et al. | 408/201 |
| 4,975,001 A | | 12/1990 | Rabo et al. | |
| 5,000,629 A | | 3/1991 | Nygards | |
| 5,054,179 A | * | 10/1991 | Rini | 29/213.1 |
| 5,401,126 A | | 3/1995 | Norris et al. | |
| 6,412,376 B1 | * | 7/2002 | Borgia, Jr. | 82/113 |

* cited by examiner

Primary Examiner—Daniel W. Howell
(74) Attorney, Agent, or Firm—Sand & Sebolt

(57) ABSTRACT

A tool for cutting a plastic pipe comprising a concave guide section having a central aperture; and a plunger having a longitudinal axis extending through the central aperture and at least one blade extending in generally radial relation from the central axis inside the concave guide section.

34 Claims, 6 Drawing Sheets

TOOL FOR REMOVING CUT-OFF PLASTIC PIPE IN A PIPE SOCKET AND METHOD OF USE

BACKGROUND OF THE INVENTION

1. Technical Field

The present invention relates to cutting articles by use of a rotating axially moving tool and more particularly to cutting tools having a work-engaging structure and angled or stepped cutting edges. Still more particularly, the present invention relates to cutting plastic pipe to enable a lateral pipe to be replaced on a Y-connection, a T-connection or a 90° connection.

2. Background Information

The prior art discloses various tools and methods for cutting pipe.

U.S. Pat. No. 3,752,592 to Fitzgerald, et al., for example, discloses a pipe reamer apparatus particularly for use with plastic pipe and a method of reaming plastic pipe fittings such as elbows or the like.

U.S. Pat. No. 3,872,748 to Bjalme, el al. discloses a tool for beveling plastic pipe in which the tool is carried in a slide inclined at the bevel angle and fed toward the pipe end as it is rotated about the axis of the pipe.

U.S. Pat. No. 4,483,222 to Davis discloses a device for removing pipe attached to a fitting includes cutting apparatus for removing the pipe disposed within the fitting. A wrench apparatus is connected to the cutting apparatus for gripping the fitting to prevent its movement when the cutting apparatus is activated. Alternatively, this device may be used as a reaming device which permits radial movement of the cutting blades into engagement with a pipe after the cutting blades have been inserted within the pipe.

U.S. Pat. No. 4,693,643 to Heyworth discloses a planing device which is operable for progressively planing or cutting the end of a plastic pipe to the desired length, or for reaming out a piece of plastic pipe fixed in a plastic pipe fitting in such a manner that the plastic pipe fitting can be reused. The pipe planing device is portable and is rotated by an electric drill or the like and includes a cylindrical pilot removably supported on radially spaced-apart spider-like cutter arms having cutter blades attached to their outer ends and extending outwardly beyond the cylindrical pilot distance which is equal to the thickness of the plastic pipe to be cut or reamed. The outer circumference of the cylindrical pilot is dimensioned to provide a snug rotatable fit within the end of the plastic pipe to be planed and operates to center the planing device along the longitudinal axis of the plastic pipe.

U.S. Pat. No. 4,975,001 to Rabo, et al. discloses a plastic pipe reboring tool having an elongated shank, a generally concave-convex cutting head, and changeable guide discs effective for cleaning residue glue and plastic from used plastic pipe and fittings so they can be used over again. The reboring tool is operational with both powered and manual chuck rotating devices and can be used on different sizes of plastic pipe.

U.S. Pat. No. 5,000,629 to Nygards discloses a self-centering plastic pipe router tool for routing of a sawed-off end of pipe from the interior surface of a salvageable pipe. The router tool is a disk with an axial shank on one side of the disk. A pair of cutting flanges extend radially outwardly and upwardly in the direction of the axial shank form the disk perimeter to form first and second cutting edges. A concentric cylindrical skirt extends downwardly form the disk for axial centering of the router tool within the waste pipe inner diameter. The first cutting edges are sized for routing of the waste pipe and second cutting edges are sized to plane and refinish the interior surface of the salvageable pipe for re-use.

U.S. Pat. No. 5,401,126 to Norris, et al. discloses a bit usable in combination with a rotatory diver, such as a drill, for extracting a remnant of a cut-off pipe from a pipe socket. The bit comprises a forward portion which is a pilot to keep the bit centered in the remnant and thereby centered in the pipe socket, a forward-facing ring cutter whose inner and outer diameters generally match the inner and out diameters of the pipe remnant being extracted, said ring cutter bing operable to cut and/or scrape the remnant edgewise form the socket, and a forward facing ring scraper operable to stop the bit from excessive penetration into the pipe socket and operable to scrape bonding material remnants form the end face of the pipe coupling.

In working with plastic pipe, a relatively common procedure involves replacing a lateral line which extends at a Y-connection, a T-connection or 90° connection at a at a main pipe line. This procedure is relatively time and labor intensive and an improved means of carrying this procedure out is needed.

BRIEF SUMMARY OF THE INVENTION

It is an object of the present invention to provide an improved apparatus and method for replacing a lateral line which extends from a Y-connection, a T-connection or a 90° connection at a main pipe line.

This and other objects are met by the present invention which is a tool for cutting a plastic pipe comprising a concave guide section having a central aperture. A plunger having a longitudinal axis extends through the central aperture and at least one blade extends in generally radial relation from the central axis inside the lower concave skirt section.

In another embodiment the present invention is a tool for cutting a plastic pipe comprising a concave guide section comprising a lower skirt comprising an upper generally horizontal member and a lower peripheral wall member. There is an aperture in said upper horizontal member and a tubular section having an upper and a lower terminal end and an interior axial passageway and is positioned at said lower terminal end such that said axial passageway is aligned with the central aperture of the generally horizontal member of the lower skirt section. A plunger comprising an upper rod having an upper and a lower terminal end and a spiring retaining structure adjacent said upper terminal end and is disposed in said axial passageway of the tubular member of the concave guide section in coaxial relation with said tubular member and is positioned such that said upper terminal end is elevated above the upper terminal end of the tubular member. A lower blade retaining structure is formed in which at least one blade having a distal edge extends in a generally radial direction such that said distal edge is positioned in spaced inward relation from the lower peripheral wall member of the concave guide section. A helical spring having an upper terminal end and a lower terminal end and coaxially overlaps the upper rod member and bears against the spring returning structure of the rod member at its upper end and bears against the upper terminal end of tubular member at its lower end.

Also encompassed by the present invention is a method for replacing a first lateral pipe with a second lateral pipe when the first lateral pipe is connected to a main pipe line by a Y-connection, a T-connection or a 90° connection. In this method the first lateral pipe is cut outwardly from the widened connection socket on the Y-connection, a T-connection or a 90° connection. A tool as is described above is then positioned reality to the widened connection section so that the inner surface of the concave guide section bears against the outer surface of widened lateral connecting section and distal edge of the blade bears against the first lateral pipe section. The plunger is then rotated about it longitudinal axis so that the blade cuts away at least part of the inner first lateral pipe section to form a pipe receiving space adjacent the widened connection socket. A second lateral pipe is then inserted end wise into the pipe receiving space to complete the procedure.

BRIEF DESCRIPTION OF THE DRAWINGS

The present invention is further described with the reference to the accompanying drawings in which.

DETAILED DESCRIPTION OF THE INVENTION

Figure 1:
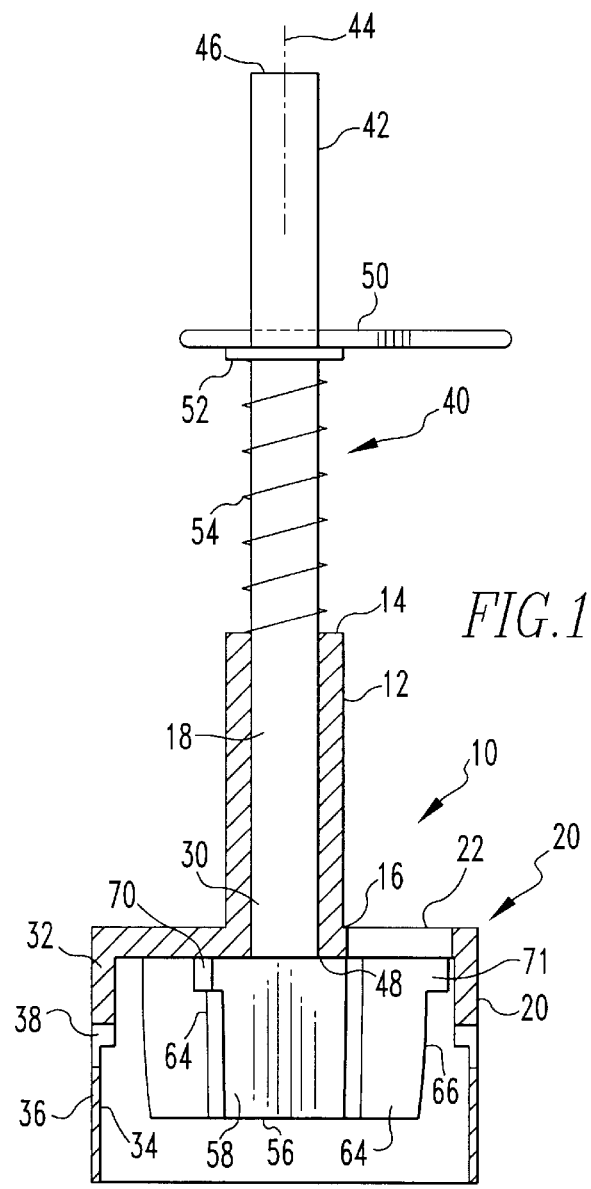
FIG. 1 is a cut-away front elevational view of a preferred embodiment of the pipe cutting tool of the present invention.
Figure 2:
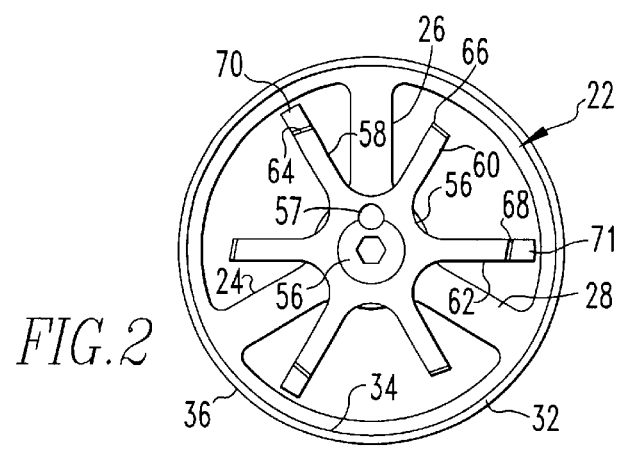
FIG. 2 is a bottom plan view of the pipe cutting tool shown in FIG. 1.

Referring to FIGS. 1 and 2, the cutting tool of the present invention includes a guide section 10 which is made up of a tubular section 12 which has an upper terminal end 14 and a lower terminal end 16 and an axial bore 18. The guide section 10 also includes a lower skirt section 20 which has a horizontal top 22 made up of radial support members 24, 26 and 28 with a central aperture 30.

The lower skirt section 20 also includes a peripheral wall member 32 which has an inner side 34 and an outer side 36 with a plurality of apertures as at aperture 38 in this peripheral wall member 32 which allows operation of the tool to be monitored. The cutting tool also includes a plunger section 40 which has an upper rod 42 having a longitudinal axis 44 and an upper terminal end 46 and lower terminal end 48. A pin 50 and washer 52 serve as a retaining member for a helical spring 54, which is also retained at its lower end by the upper terminal end 14 of tubular member 12 of the guide section 10. The plunger section 40 also includes a lower central blade support structure 56 from which blades as at blades 58, 60 and 62 extend radially. These blades have respectively wedge shaped terminal cutting edges 64, 66 and 68. Blades 58 and 62 also have respectively upper outwardly extending steps 70 and 71.

Figure 3:
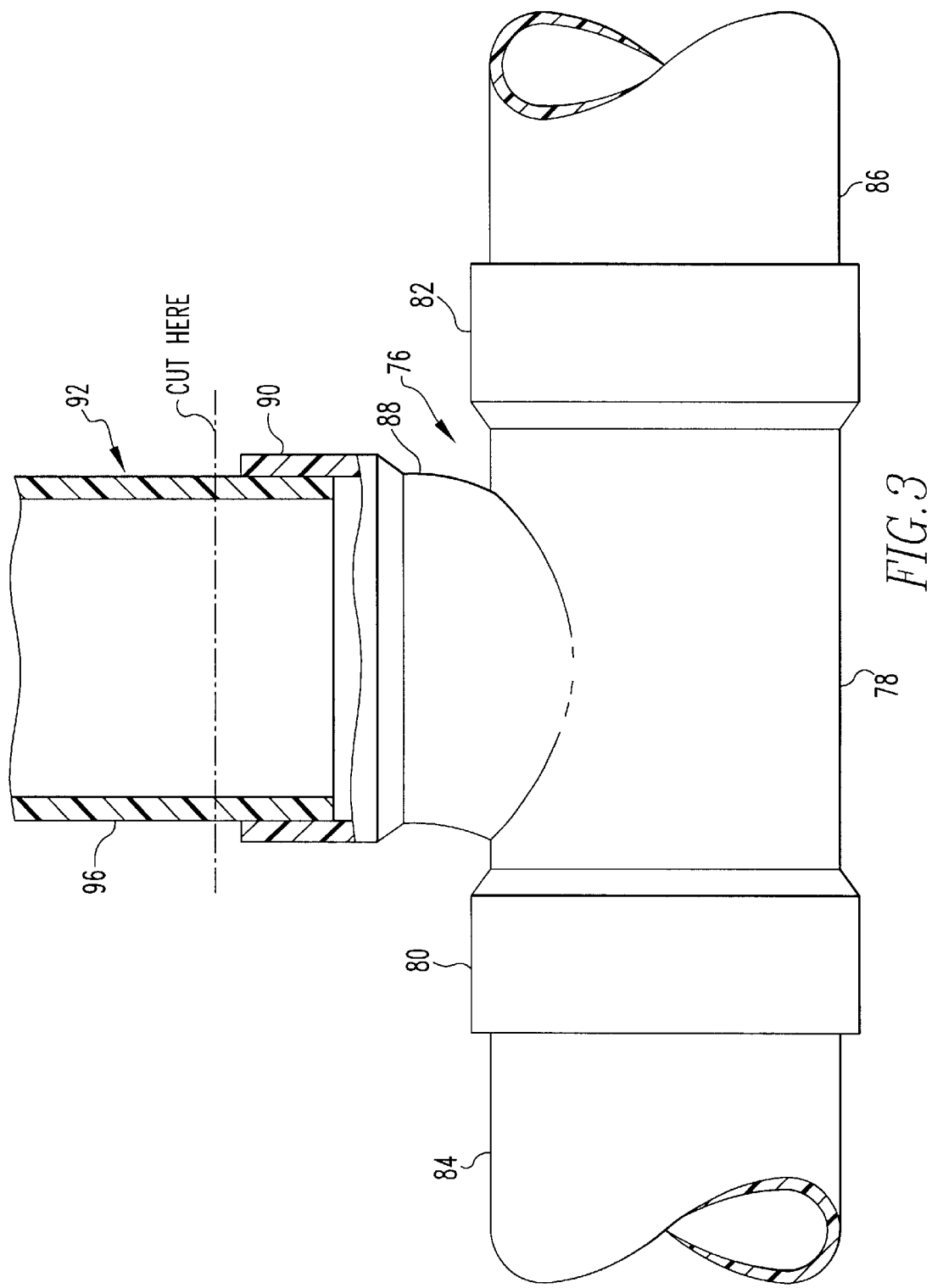
FIG. 3 is a schematic view of a lateral line extending from a main line in which illustrates a first step in a preferred embodiment of the method of the present invention.
Figure 4:
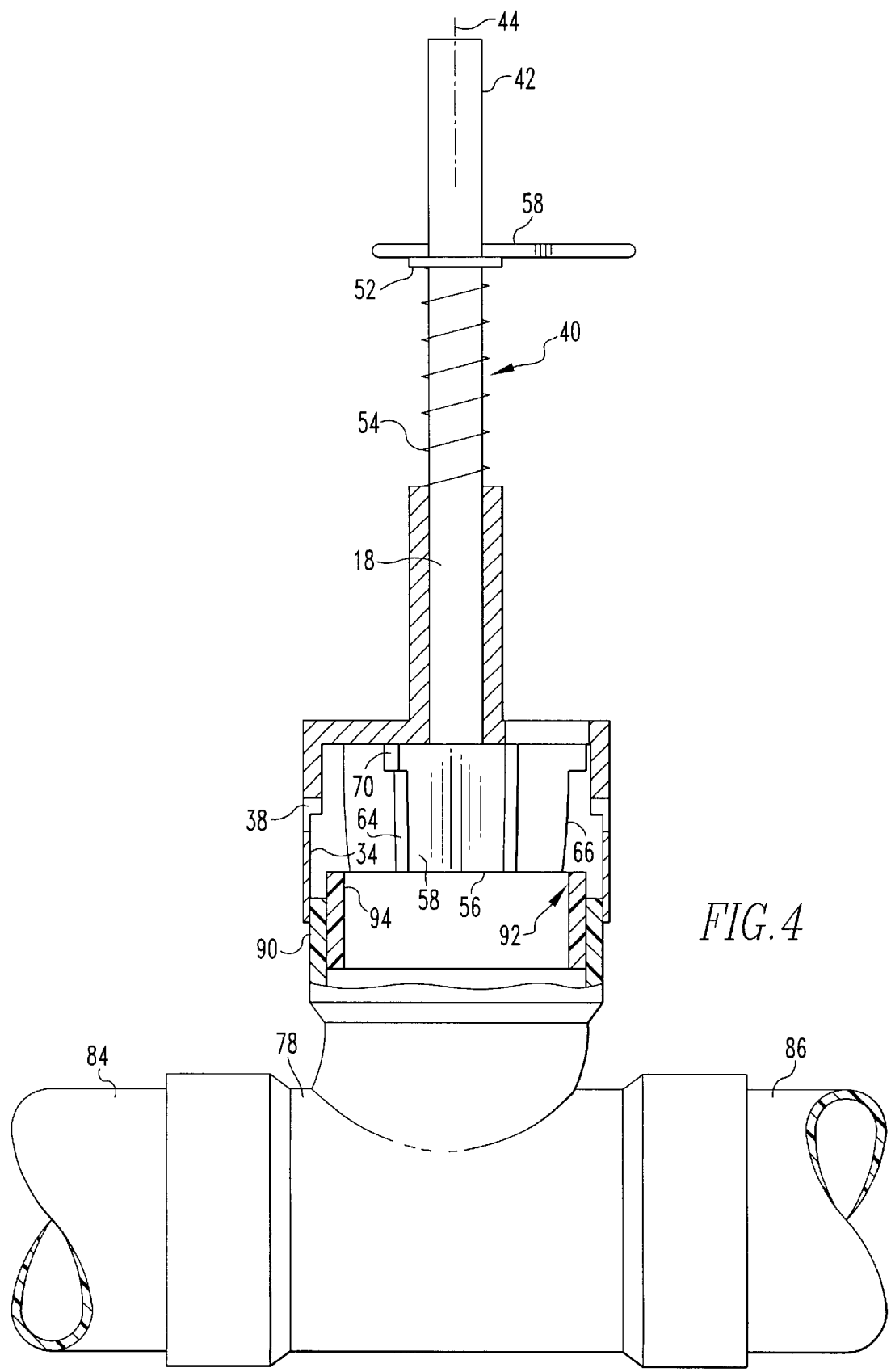
FIG. 4 shows the pipe arrangement shown in FIG. 3 after attachment of the cutting tool shown in FIG. 1 to illustrate further steps in the preferred embodiment of the method of the present invention.

Referring to FIGS. 3 and 4, the method of using the tool described above to replace a lateral pipe extending from a Y-connection or T-connection is described. In these figures there is a Y-connection 76 with a horizontal section 78 having at its opposed ends widened pipe sockets 80 and 82. Main line pipes 84 and 86 are connected respectively to the Y-connection 76 at the widened pipe sockets 80 and 82. The Y-connection 76 also includes a lateral section 88 which has a terminal widened pipe socket 90. A lateral pipe 92 is connected endwise to this widened pipe socket 90 and extends outwardly therefrom. In the first step of the method of this invention the lateral pipe 92 is cut slightly outwardly from the pipe socket 90 as is shown particularly in FIG. 3. Lateral pipe 92 is thereby divided into an inner lateral pipe section 94 which remains attached to the pipe socket 90 and an outer pipe lateral pipe section 96 which is removed. As is shown particularly in FIG. 4, in the next step of the method the tool shown in FIGS. 1 and 2 is positioned on the Y-connection 76 so that the blade edges as at 64, 66 and 68 bear against the inner lateral pipe section 94 and the inner side 34 of the peripheral wall member 32 bears against the pipe socket 90. The upper rod 42 of the plunger section 40 is then rotated about its longitudinal axis 44 so that the blades cut or abraid the inner lateral pipe section 94 until some or all of the pipe section 94 is removed so that a pipe receiving space is formed adjacent the pipe socket 90. A new lateral pipe 92 is then inserted endwise into the pipe socket 90 to finalize the procedure.

Figure 5:
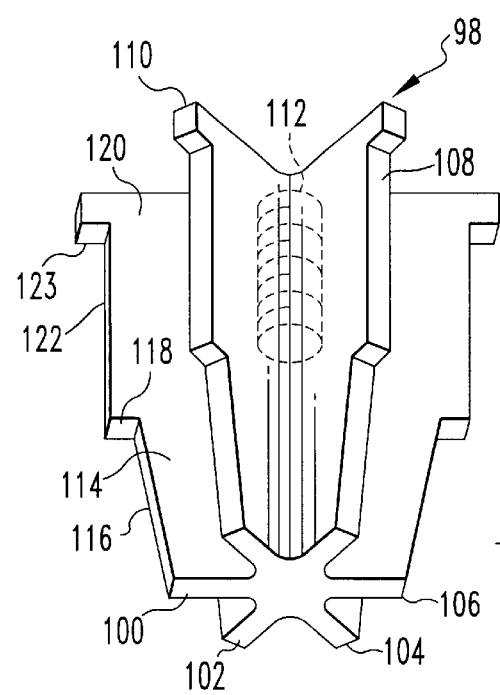
FIG. 5 is a bottom and front perspective view of a bit which may be used in an alternate embodiment of the cutting tool of the present invention.

Referring to FIG. 5, there is shown a bit 98 which may be used in an alternate embodiment of the pipe cutter of the present invention. This bit 98 includes blades 100, 102, 104, 106, 108 and 110. The bit 98 also includes a threaded bore 112 to allow attachment to a rod (not shown) similar to the one shown in FIG. 1 and described above. Each blade as, for example, blade 100 includes a lower section 114 which has a cutting edge 116. There is also a lower step cutting edge 118 and an upper section 120 with a cutting edge 122. Above cutting edge 122 there is an upper step cutting edge 123.

Figure 6:
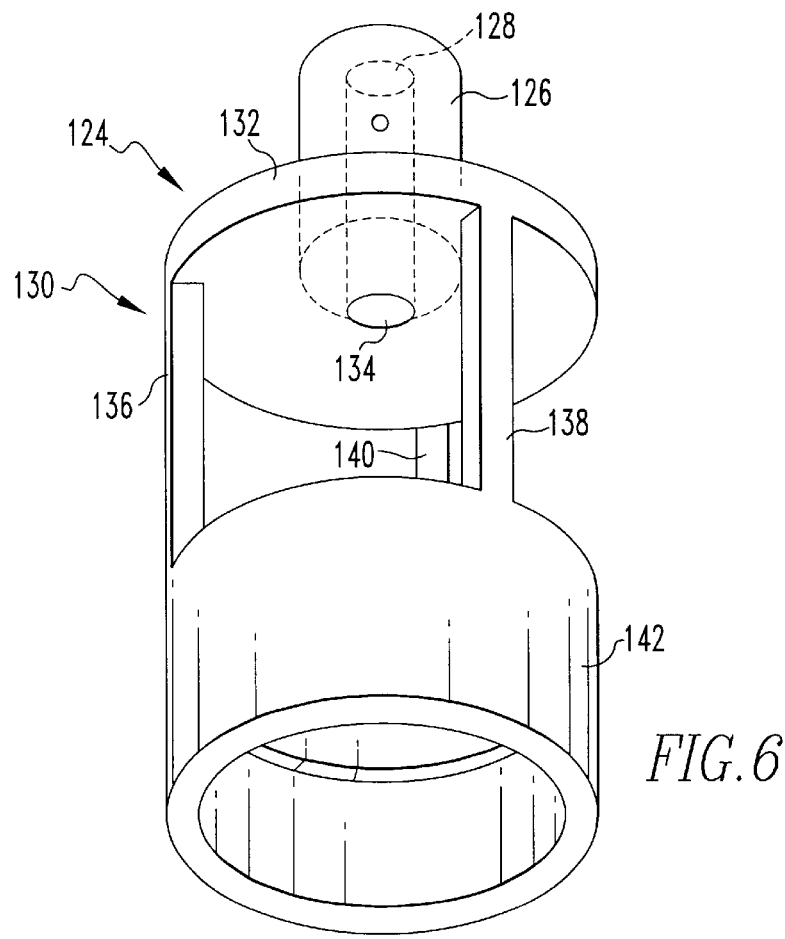
FIG. 6 is a bottom and front perspective view of a guide section which may be used with the bit shown in FIG. 5 in an alternate embodiment of the cutting tool of the present invention.

Referring to FIG. 6, a guide section 124 which may be used in an alternative preferred embodiment is shown. This guide section 124 has a tubular member 126 with an axial bore 128 and a concave section 130. This concave section 130 comprises a horizontal member 132 with a central aperture 134 and is connected by vertical supports 136, 138 and a 140 to a lower skirt member 142.

Figure 7:
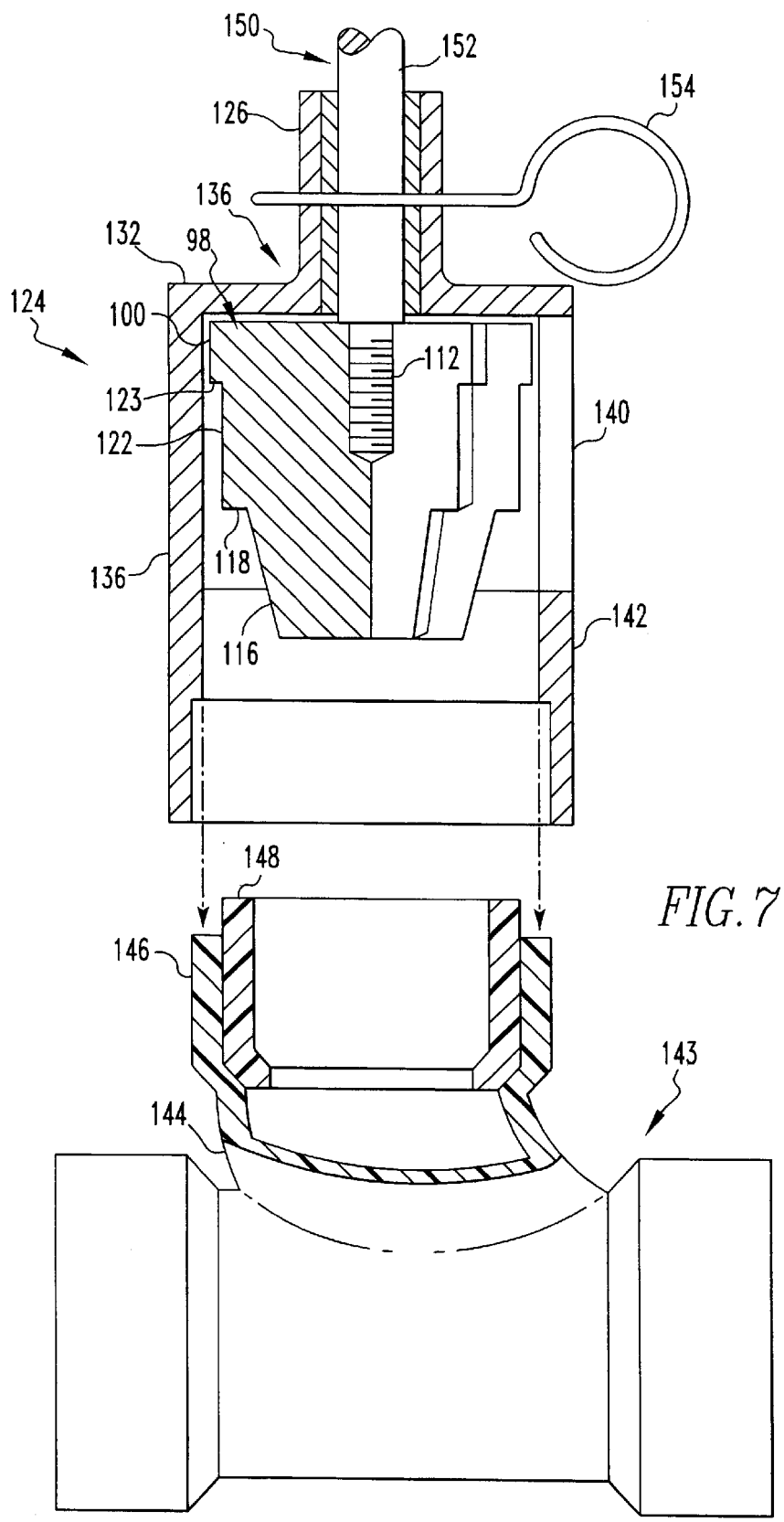
FIG. 7 is a vertical cross-sectional view of an alternate embodiment of the cutting tool of the present invention using the bit shown in FIG. 6 and also show in conjunction with a Y-connection to illustrate a step in the method of the present invention.
Figure 8:
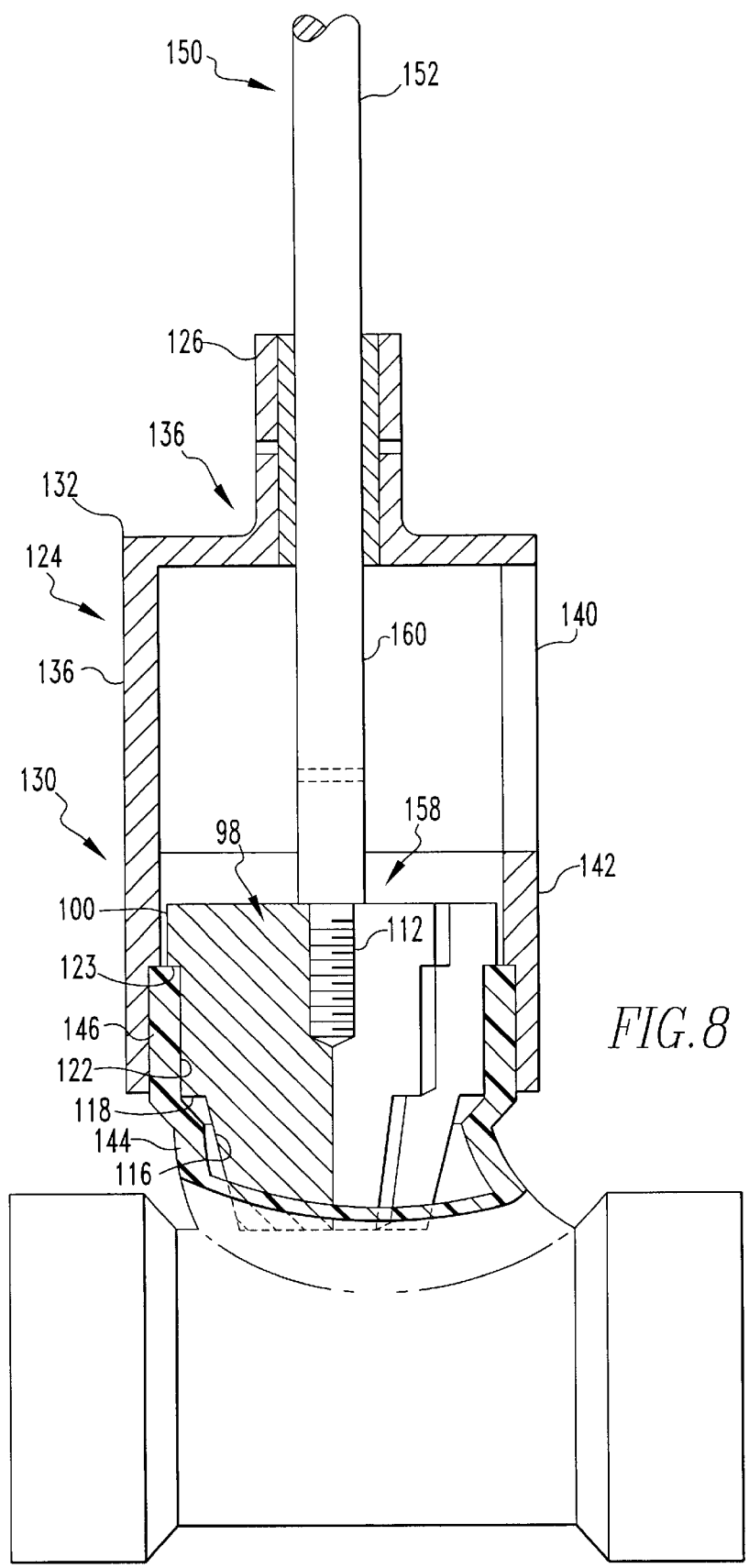
FIG. 8 is a vertical cross-sectional view of the cutting tool shown in FIG. 7 in use on a Y-connection to show further steps in the method of the present invention.

Referring to FIGS. 7 and 8, the method of use of the alternative preferred embodiment using the bit 98 shown in FIG. 5 and guide section 124 shown in FIG. 6 is illustrated. Here there is a Y-connection 143 similar to the structure described in FIGS. 3 and 4 which has a lateral section 144 with a widened pipe socket 146. The first section of lateral pipe 148 which remains after the pipe has been cut in the way described above is fixed endwise in the widened pipe socket 146. The alternate embodiment of the cutter is shown in FIG. 7 in an initial position axially aligned with widened pipe socket 146 and the first section of lateral pipe 148. It will be observed that in addition to the features described above in the bit 98 and guide section 124 the tool has a plunger 158 which includes the rod 160 which is fitted with the threaded bore of the bit 98. In this position a pin 154 which extends through apertures in the tubular section 126 and rod 160 holds the bit 98 in an upper position in the guide section 124 adjacent the horizontal member 132. After the pin 154 is removed the rod 160 along with the bit 98 is moved forward to engage the first section of the lateral pipe with the blades as at blade 100 at the same time the skirt 142 outwardly engages the widened pipe socket 146. The rod 160 is rotated about its longitudinal axis so that the blades as at blade 100 cut or abraid the first section of lateral pipe 148 to allow its removal, thus leaving a pipe receiving space adjacent the pipe socket 146. In particular, it will be seen from FIG. 7 that pipe 148 is cut by cutting edges 116 and 118. The tool is then removed from the widened pipe socket to allow a second lateral pipe (not shown) to be inserted endwise into the widened pipe socket 146. It will also be appreciated that it would be possible to increase the inner diameter of a pipe. For example, it will be seen from FIG. 8 that the inner diameter of pipe socket 146 could be increased by means of cutting edge 123 with support being provided by cutting edge 122.

Those skilled in the art will appreciate that the tool and method of its use described above on a Y-connection can easily be adapted to replace a lateral pipe connected to a T-connection or a 90° connection.

It will be appreciated that a tool and the method of its use has been described which allows for the efficient, quick and cost effective removal of a lateral pipe on a Y-connection, a T-connection or a 90° connection and its replacement with another lateral pipe to that connection.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A tool for cutting a plastic pipe, the tool comprising:
   a concave guide section having a central aperture; and
   a plunger having a central longitudinal axis extending through the central aperture and at least one blade extending in generally radial relation from the central axis inside the concave guide section; the blade being stepped upwardly and outwardly.

2. The tool of claim 1 wherein the concave guide section comprises an upper tube element and a lower skirt element.

3. A tool for cutting a plastic pipe, the tool comprising;
   a concave guide section having a central aperture;
   a plunger having a longitudinal axis extending through the central aperture and at least one blade extending in generally radial relation from the longitudinal axis; at least a portion of the at least one blade being receivable within the concave guide section; and
   the at least one blade having a first cutting surface and a second cutting surface disposed above and spaced from the first cutting surface.

4. The tool of claim 3 wherein the first cutting surface is noncontinuous with the second cutting surface.

5. The tool of claim 3 wherein the second cutting surface is parallel to the longitudinal axis.

6. The tool of claim 1 wherein a plurality of blades extend radially from the central axis.

7. The tool of claim 3 wherein the second cutting surface is spaced outwardly from the first cutting surface.

8. The tool of claim 7 wherein a third cutting surface is disposed between and extends from the first cutting surface to the second cutting surface.

9. The tool of claim 1 wherein the blade is positioned on a bit.

10. The tool of claim 9 wherein there are a plurality of blades on said bit.

11. The tool of claim 3 wherein the second cutting surface is spaced upwardly from the first cutting surface.

12. The tool of claim 11 wherein a third cutting surface is parallel to the longitudinal axis and extends from the first cutting surface to the second cutting surface.

13. The tool of claim 3 wherein a third cutting surface is disposed above and spaced from the second cutting surface.

14. A tool for cutting a plastic pipe, the tool comprising:
   a concave guide section having a central aperture;
   a plunger having a longitudinal axis extending through the central aperture and at least one blade extending in generally radial relation from the central axis inside the concave guide section; and
   a means for applying a downward force on the concave guide section.

15. The tool of claim 14 further comprising an upper stationary structure on the plunger against which the means bears to bias the concave guide section downwardly to provide the downward force.

16. The tool of claim 15 wherein the means comprises a helical spring interposed between the stationary structure and the concave guide structure.

17. The tool of claim 16 wherein the plunger comprises an upper rod section which is coaxially positioned inside the helical spring.

18. The tool of claim 1 wherein the plunger is rotatable about its longitudinal axis.

19. A tool for cutting a plastic pipe comprising:
   a concave guide section comprising:
      a lower skirt comprising an upper generally horizontal member and a lower peripheral wall member wherein there is a central aperture in said upper horizontal member; and
      a tubular section having an upper and a lower terminal end and an interior axial passageway and being positioned at said lower terminal end such that said axial passageway is aligned with the central aperture of the upper horizontal member of the lower skirt;
   a plunger comprising:
      an upper rod having an upper and a lower terminal end and a spring retaining structure adjacent said upper terminal end and being disposed in said axial passageway of the tubular section of the concave guide section in coaxial relation with said tubular section and being positioned such that said upper terminal end is elevated above the upper terminal end of the tubular section;
      a lower blade retaining structure from which at least one blade having a distal edge extends in a generally radial direction such that said distal edge is positioned in spaced inward relation from the lower peripheral wall member of the concave guide section; and
      a helical spring having an upper terminal end and a lower terminal end and coaxially overlapping the upper rod and bearing against the spring retaining structure of the upper rod at said upper end and bearing against the upper terminal end of the tubular section at said lower end.

20. A method for replacing a first lateral pipe with a second lateral pipe wherein the first lateral pipe is connected to a main pipe by a Y-connection, a T-connection or a 90° connection having a widened lateral connecting section into which said first lateral pipe is inserted to coaxially engage said Y-connection or T-connection or 90° connection, said method comprising the steps of:

(a) cutting said first lateral pipe outwardly from said widened connecting section to form an outer first lateral pipe section which is removed and an inner first lateral pipe section which remains coaxially engaged with the widened lateral connecting section of the Y-connection, T-connection or 90° connection;

(b) providing a tool comprising a lower concave guide section having a central aperture and an inner surface; and a plunger having a central longitudinal axis extending through the central aperture and at least one blade having a distal edge and extending in generally radial relation from the central axis inside the lower concave section;

(c) positioning the tool provided in step (b) relative to the widened lateral connecting section of the Y-connection, T-connection or 90° connection such that the inner surface of the concave guide section bears against an outer surface of the widened lateral connecting section and the distal edge of the blade bears against the inner first lateral pipe section;

(d) rotating the plunger about its longitudinal axis so that the blade cuts away at least part of the inner first lateral pipe section to form a pipe receiving space adjacent the widened lateral connecting section; and (e) inserting the second lateral pipe endwise into the pipe receiving space formed adjacent the widened lateral connection section in step (d).

21. The tool of claim 1 wherein the at least one blade has a lower first portion cutting edge extending generally upwardly and a first step cutting edge extending generally outwardly above the first portion cutting edge whereby the blade is stepped upwardly and outwardly.

22. The tool of claim 21 wherein the first portion cutting edge tapers upwardly and outwardly toward the second cutting edge.

23. The tool of claim 22 wherein the at least one blade has a second portion cutting edge disposed above the first step cutting edge whereby the blade is further stepped upwardly.

24. The tool of claim 23 wherein the at least one blade has a second step cutting edge above the second portion cutting edge whereby the blade is further stepped outwardly.

25. The tool of claim 24 wherein the at least one blade has a third portion cutting edge disposed above the second step cutting edge whereby the blade is further stepped upwardly.

26. The tool of claim 23 wherein the second portion cutting edge is parallel to the central axis.

27. The tool of claim 26 wherein the first step cutting edge is perpendicular to the central axis.

28. The tool of claim 25 wherein the second and third portion cutting edges are parallel to the central axis.

29. The tool of claim 28 wherein the first and second step cutting edges are perpendicular to the central axis.

30. A tool for cutting a plastic pipe, the tool comprising;
a concave guide section having a central aperture;
a plunger having a longitudinal axis extending through the central aperture and at least one blade extending in generally radial relation from the longitudinal axis; at least a portion of the at least one blade being receivable within the concave guide section; and
the at least one blade having a cutting edge which includes a first portion and a second portion disposed above and outwardly of the first portion; the first portion tapering upwardly and outwardly and the second portion being parallel to the longitudinal axis.

31. The tool of claim 30 wherein the cutting edge includes a third portion disposed above and outwardly of the second portion.

32. The tool of claim 31 wherein the third portion is parallel to the longitudinal axis.

33. The tool of claim 13 wherein the third cutting surface is parallel to the longitudinal axis.

34. The tool of claim 33 wherein the second cutting surface is parallel to the longitudinal axis.

* * * * *